April 16, 1929.   N. R. KRAUSE   1,709,178
COMBINATION HARVESTER THRASHER
Filed July 6, 1926   2 Sheets-Sheet 1
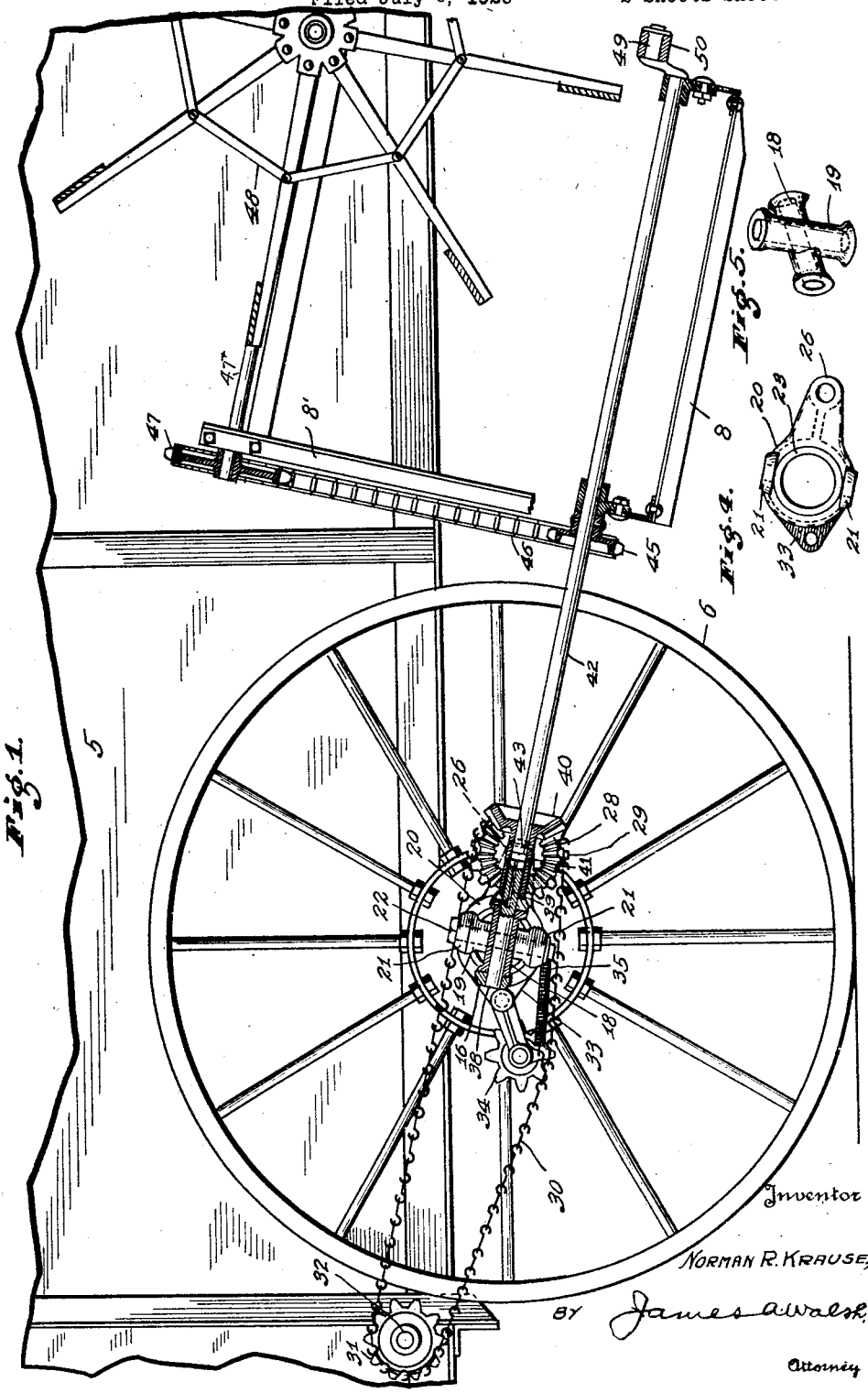
Inventor
NORMAN R. KRAUSE,
BY James A. Walsh
Attorney April 16, 1929.  N. R. KRAUSE  1,709,178
COMBINATION HARVESTER THRASHER
Filed July 6, 1926  2 Sheets-Sheet 2
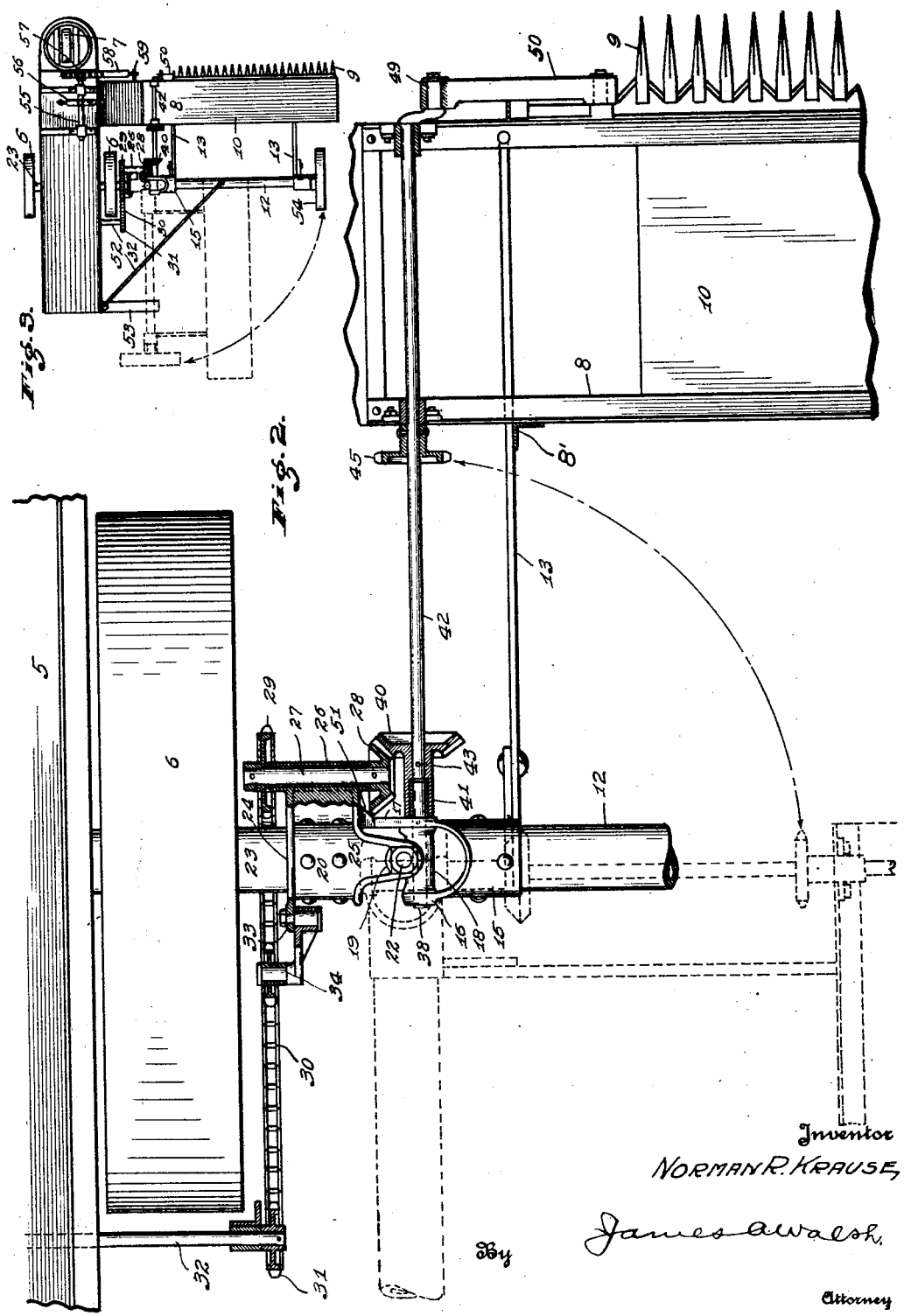

Patented Apr. 16, 1929.

1,709,178

UNITED STATES PATENT OFFICE.

NORMAN R. KRAUSE, OF RACINE, WISCONSIN, ASSIGNOR TO J. I. CASE THRESHING MACHINE COMPANY, OF RACINE, WISCONSIN, A CORPORATION.

COMBINATION HARVESTER THRASHER.

Application filed July 6, 1926. Serial No. 120,623.

My invention relates to improvements in combination harvester-thrashers particularly of that character in which the harvester is folded alongside the thrasher to reduce the width of the combined machine for moving through narrow passageways, such type of machine being disclosed in the Dugan Patent No. 1,350,012, dated August 17, 1920, my object being to provide a simple and efficient driving mechanism for operating the harvester from the thrasher which will permit the folding and unfolding of the harvester at will without interference or adjustments of the driving elements and parts associated therewith.

In the accompanying drawings, forming part hereof, Figure 1 is a fragmentary side elevation of a combination harvester-thrasher embodying my invention; Fig. 2 a plan; Fig. 3 is a diagrammatic view illustrating a combination machine with my improvements applied thereto; Fig. 4 a detail front elevation of a coupling member which I employ; and Fig. 5 a perspective of the coupling connector which I employ.

In said drawings the portions marked 5 indicate the thrasher, supported by wheels 6, 7, and 8 is the harvester embodying a cutter-bar 9 and conveyor 10, all of which parts may be of any desired construction and arrangement.

The harvester 8 may be supported upon an axle, 12, or otherwise, preferably by arms, as 13, attached in any desired manner. The support 12 is provided with a coupling member, 15, having a yoke, 16, 17, the latter member being preferably elongated for a purpose to appear. Between said yoke members I mount a connector comprising horizontal and vertical members, 18, 19, to which member 19 a coupling, 20, is connected by arms, 21, through which arms and said member 19 a vertical pin, 22, is inserted, so that by said members 18, 19, the couplings thus connected permit coupling member 15 to move in both horizontal and vertical relation to member 20. Said coupling member 20 is secured to the rotatable axle, 23, or other suitable support on the thrasher, and embodies a flange, 24, which, together with the body of the coupling and the reinforcing rib, 25, supports a bearing, 26, for a driven shaft, 27, provided at its outer end with a bevel-gear, 28, and at its inner end with a sprocket, 29, which latter is connected by chain, 30, to a driving sprocket, 31, mounted on a shaft, as 32, and which latter is driven from any suitable source of power on the thrasher. The opposite side of said flange 24 embodies a support, 33, upon which I mount a chain tightener, 34, the latter being held in adjustable engagement with chain 30 by means of a spring, 35, connected to said tightener and to one of the arms 21 or other portion of the coupling as may be expedient.

In connector member 18 I mount a shaft, 38, which extends forwardly therefrom, constituting a bearing, and is provided with oil grooves, 39, as shown in Fig. 1. Upon said shaft 38 I mount bevel-gear, 40, by means of sleeve 41, forming part thereof, and in which gear I secure rotatable shaft, 42, by means of pin, 43, so that said shaft 42 and gear 40 will rotate together when gear 28 is driven through chain 30 by power from a source on the thrasher. On shaft 42 I mount sprocket, 45, which is connected by chain, 46, to sprocket, 47, secured to shaft 47′ on harvester frame 8′ for rotating the reel, 48. Shaft 42 is also utilized for actuating the cutter-bar 9 by cranking said shaft, as at 49, and connecting said cranked end to the cutter-bar 9 by a pitman, 50, and said shaft may also be connected with conveyor 10 in any suitable manner for moving the latter. In the manner described I provide simple and efficient means for operating the harvester mechanisms and at the same time so connect the thrasher and harvester that the latter may be folded and unfolded without affecting the alinement of the driving mechanisms or dismantling or disturbing the parts thereof when adjusting the harvester to cutting and folding positions.

In field operations, it will be understood that the harvester is frequently moved downwardly and upwardly from the position shown in Fig. 1 to adjust the harvester to the varying heights of grain being cut. Such adjustments are freely permitted by the rocking axle 23 to which couplings 20 and 15 are connected, said axle couplings and associated parts being a unitary structure and adapted to follow the range of movements to which the harvester 8 is subjected, and as the tightener 34 is in constant engagement with chain 30 through the controlling action of spring 35 the proper relation of said chain to sprockets 29 and 31 is maintained during the rocking movement of the parts referred to. When the harvester is in cutting position as shown in Fig. 2 it will be noted that the elongated yoke member 17 abuts against a stop, 51, thus regulating the mesh of gears 28 and 40 and maintaining proper alinement of support 12 and parts connecting and associated therewith, and by employing a staybar, 52, in the manner indicated in Fig. 3 or otherwise, the assemblage of the thrasher, harvester and parts connecting the same is further stabilized. The vertical adjustments of the harvester are accomplished in any well known manner by mechanism under control of an operator on the thrasher, for example, such as illustrated in Fig. 3, that is, a shaft, 55, is provided on the thrasher upon which a hand-wheel, 56, is mounted, a gear-wheel, 57, being secured to said shaft and which engages a rack-bar, 58, connected, at 59, to the harvester, by which mechanisms the harvester may be vertically adjusted substantially in the manner as disclosed in the MacGregor Reissue Patent No. 16,378, dated July 6, 1926.

When transporting the machine it is of advantage to fold the harvester to decrease the width of the machine for traveling through or over narrow passageways, and by removing stay-bar 52, or other braces which may be employed, the harvester may be readily swung horizontally about the vertical pivot 22 and positioned in parallel relation to the thrasher, as indicated by the dotted lines in Fig. 3, and supported thereon by an arm, 53, or other desired manner, the ground-wheel, 54, being of assistance in rolling the harvester when such horizontal adjustment is performed. By mounting gear 40 and shaft 42 in the manner described and as indicated in Fig. 2, it will be readily understood that gear 40 will become freely separated from gear 28 as the harvester is being swung around to the position indicated by the dotted lines, and that said two gears will as readily mesh when the harvester is brought to cutting position as indicated by the full lines in Fig. 2. As shafts 27 and 42 are mounted independently of each other it will be apparent that each will be maintained in constant alinement and undisturbed during the folding and unfolding operations of the harvester. I have described my improved thrasher and harvester connection as applied to a rotatable shaft 23 supporting the thrasher, but it will be understood that such shaft or other suitable support for the coupling may be non-rotatable and that by slight modification said coupling and associated parts can be sufficiently rocked for the adjustments required during the cutting operation of the harvester.

When operating in the field the harvester is necessarily subjected to considerable vertical oscillation because of ground irregularities, and to permit such movements to be freely made without affecting the harvester operating shaft 42 or the means for rotating the same the connecting shaft or pintle 38 is so mounted, as shown in Fig. 2, that its end projects sufficiently to provide a substantial support for the combined gear and shaft 40, 42, and by such assemblage pintle 38 and shaft 42 are in longitudinal alinement and on a common center, permitting an extensible range of vertical movement for support 12 without producing any cramping effect upon the associated parts referred to, which mounting permits the use of a rigid shaft for driving the harvester mechanism. In employing stiff driving means, such as shaft 42, for operating the harvester mechanism I am enabled to assemble and position the actuating system therefor at an appreciable distance from the ground, as indicated in Fig. 1, to operate under clean conditions, in contradistinction to the commonly used lowdown flexible shafts connecting the harvester and thrasher and which include universal joints and other devices subject to breakage from contact with obstacles in the soil and the changeable and extreme angular variations occurring in such driving means resulting from frequent vertical adjustments of the harvester and rough conditions incident to field work; and by providing a positively rigid driving shaft for the purpose power economy is established, as it will be understood that in flexible drive systems considerable power is consumed in maintaining constant speed thereof during the many changes in angularity to which it is subjected by the extreme vertical adjustments of the harvester. When the harvester is folded the thrasher may be operated without affecting any of the driving parts of the thrasher, so that if it is desired to thrash grain from ricks and the like, or to thrash in the ordinary way without employing a harvester and header, the mechanism on the thrasher for driving the harvester may be permitted to run idly, or stopped by removing chain 30, while the harvester is at rest, in which manner the thrasher may be operated entirely independently of the folded harvester.

I claim as my invention:

1. In a machine of the class described, a thrasher, a harvester, coupling members secured to said elements, a horizontal pintle connecting said members, a shaft connected to said harvester and to one of said coupling members and in longitudinal alinement with said pintle to permit unobstructed vertical oscillation of said harvester to cut varying heights of grain, and means for rotating said shaft to operate mechanism on said harvester.

2. In a machine of the class described, a thrasher, a harvester, means for connecting said elements, driving means supported by said connecting means, non-flexible means connected to said driving means and to said harvester, and means on said thrasher for actuating said driving means to rotate said non-flexible means to operate mechanisms on said harvester.

3. The combination, with a thrasher and a harvester disposed transversely with respect to the thrashing machine, of a support for the harvester, a wheel on the outer end of said support, a universal joint connecting the inner end of the harvester support to the thrashing machine to permit oscillation of said harvester, means for vertically adjusting the harvester to cut varying heights of grain, a drive-shaft connected to said support and to said harvester for operating mechanisms on said harvester, and means engaging said drive-shaft and operated from a source of power on the thrasher for driving said shaft.

4. The combination, with a thrashing machine and a harvester disposed transversely with respect to the thrashing machine, of a support for the harvester, a flexible joint connecting the inner end of the harvester support to the thrashing machine to permit oscillation of the harvester, a drive-shaft connected to said support and to said harvester for operating mechanisms on said harvester, means for vertically adjusting the harvester to cut varying heights of grain, and means engaging said drive-shaft and actuated from a source of power on the thrasher for rotating said shaft.

5. In a machine of the class described, a thrasher, a harvester, supporting means for said harvester connected to said thrasher, driving means secured to the supporting means and to the harvester for actuating the cutting and conveying means of the latter, and hinged means in the supporting means whereby the driving means may be separated and said harvester mechanisms rendered inactive when the harvester is folded in relation to the thrasher to permit the thrasher to operate independently of the harvester.

6. In a machine of the class described, a harvester, a thrasher, a hinged support connecting said harvester to the thrasher embodying abutting means for limiting the movement of said support, and means for maintaining said support in fixed position.

7. In a machine of the class described, a thrasher, a harvester, a support for said harvester, a coupling member on said thrasher, a gear-wheel supported thereby, a coupling member on said support connected to said first-mentioned coupling, a drive-shaft connected to said harvester and support and having a gear meshing with said first mentioned gear, and means associated with said coupling to regulate the meshing of said gears when said harvester is adjusted to cutting position.

8. In a machine of the class described, a thrasher, a harvester, coupling members for connecting said elements, a pintle in said members and projecting therethrough to form a bearing, a gear-wheel mounted on said bearing, and a shaft mounted in said gear-wheel and connected to said harvester, said gear and shaft rotating on said bearing, and means for driving said shaft.

9. In a machine of the class described, a thrasher, a harvester, a support for said harvester, a bearing on said support, a drive-shaft connected to said bearing and harvester, and means on said thrasher for driving said shaft.

10. In a machine of the class described, a thrasher, a harvester, a support for said harvester, arms connecting said harvester to said support, a drive-shaft for the harvester connected thereto and to said support positioned in substantially parallel relation to said arms, driving mechanism connected to said shaft, and means on said thrasher for actuating said driving mechanism to rotate said shaft.

11. In a machine of the class described, a thrasher, a support thereon, a coupling mounted on said support, a shaft on said coupling, a sprocket on said shaft, a gear on said shaft, a harvester connected to said coupling, a shaft on said harvester having a gear meshing with said first-mentioned gear, and means on said thrasher for driving said sprocket to rotate said harvester-shaft and operate said harvester.

12. In a machine of the class described, a thrasher having a support, a harvester having a support, means for flexibly connecting said supports to permit vertical and horizontal oscillation of the harvester in relation to the thrasher, a harvester-operating shaft on said harvester support, gearing on said connecting means and said shaft for rotating the latter, and means on said thrasher for actuating said gearing.

13. In a machine of the class described, a thrasher, a harvester, means for rockingly connecting said elements, means connecting said thrasher and harvester for adjusting the latter, a shaft connecting said harvester and said connecting means, a gear on said shaft, a driven shaft on said connecting means having a gear thereon meshing with said first mentioned gear, and means on said thrasher connected to said driven shaft for rotating said first mentioned shaft to actuate mechanisms on said harvester.

14. In a machine of the class described, a thrasher, a harvester, means for vertically and rockingly connecting said elements, a shaft connecting said harvester and connecting means, driving mechanism on said thrasher, and gearing connected to said driving mechanism and to said shaft for actuating the latter to operate mechanisms on said harvester.

15. In a machine of the class described, a thrasher, a harvester, a coupling flexibly connecting said elements for maintaining said harvester in cutting and folding positions in relation to said thrasher, means on said coupling for maintaining its alinement when the harvester is adjusted to cutting position, a shaft connecting said harvester and said coupling, an intermeshing gear system supported by said shaft and coupling, and means for driving said gear system and shaft from the thrasher to actuate mechanisms on the harvester.

16. In a machine of the class described, a thrasher having a coupling member, a shaft having a gear-wheel supported on said member, a tightener mounted on said coupling member, a harvester having a coupling member, means connecting said members to permit vertical and horizontal adjustments of one in relation to the other, a shaft connected to said harvester and its coupling member said shaft having a gear-wheel meshing with said first-mentioned gear-wheel, means on said thrasher for driving said first named shaft to rotate the shaft on said harvester for operating mechanisms on the latter, means for vertically adjusting said harvester, and means for maintaining said tightener in contact with said driving means.

17. In a machine of the class described, a thrasher having a coupling member, a gear-wheel mounted on said member, a harvester having a coupling member, a gear-wheel supported by said harvester coupling member engaging said first mentioned gear-wheel when said harvester is in cutting position, a shaft mounted in said last-mentioned gear-wheel and said harvester, means for driving said gear-wheels to rotate said shaft, and means connecting said coupling members to permit the separation of said gear-wheels and the folding of said harvester alongside said thrasher.

18. In a machine of the class described, a thrasher, a harvester, coupling members connecting said elements, a shaft connecting said harvester and one of said members, intermeshing gears supported by said coupling members, means on said shaft for operating harvester mechanisms, and means on said thrasher for driving said gears to rotate said shaft for the purpose stated.

19. In a machine of the class described, a thrasher, a harvester, means connecting said thrasher and harvester to permit the vertical and horizontal movements of said harvester in relation to the thrasher, gearing on said connecting means adapted to intermesh when said harvester is in cutting position and to separate when the latter is being folded, and means on said thrasher for driving said gearing when said harvester is in cutting position to operate mechanisms on the latter.

20. In a machine of the class described, a thrasher, a harvester, a coupling member on said thrasher embodying a gear-wheel, a harvester, a coupling member thereon connected to said thrasher coupling, a shaft on said harvester connected to said harvester coupling, said shaft having a gear-wheel intermeshing with said first mentioned gear-wheel, means for driving said gear-wheels to rotate said shaft, and means connected to said shaft for operating mechanisms on said harvester.

21. In a machine of the class described, a thrasher, a coupling on said thrasher, a gear-wheel on said coupling, a belt-tightener on said coupling, a harvester, a coupling on said harvester, means for connecting said couplings, a gear wheel on said harvester coupling, a shaft connected to said harvester and actuated by said latter gear-wheel, means on said thrasher for driving said gear-wheels to rotate said shaft, and yielding means for maintaining said tightener in engagement with said driving means.

In testimony whereof I affix my signature.

NORMAN R. KRAUSE.